(12) United States Patent
Maede et al.

(10) Patent No.: US 7,400,097 B2
(45) Date of Patent: Jul. 15, 2008

(54) ORGANIC EL DISPLAY DEVICE

(75) Inventors: Jun Maede, Kyoto (JP); Shinichi Abe, Kyoto (JP); Masanori Fujisawa, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 124 days.

(21) Appl. No.: 10/591,959

(22) PCT Filed: Mar. 9, 2005

(86) PCT No.: PCT/JP2005/004113

§ 371 (c)(1),
(2), (4) Date: Sep. 8, 2006

(87) PCT Pub. No.: WO2005/088596

PCT Pub. Date: Sep. 22, 2005

(65) Prior Publication Data

US 2007/0195022 A1    Aug. 23, 2007

(30) Foreign Application Priority Data

Mar. 10, 2004  (JP) .............................. 2004-066820
Jul. 15, 2004   (JP) .............................. 2004-208744

(51) Int. Cl.
*G09G 3/10* (2006.01)
*G09G 5/00* (2006.01)
*G09G 3/30* (2006.01)
*G09G 3/32* (2006.01)

(52) U.S. Cl. .................. 315/169.2; 315/169.3; 345/1.1; 345/77; 345/82; 345/214

(58) Field of Classification Search ............. 315/169.2, 315/169.3, 175, 1.1, 204, 214, 76, 77, 80, 315/82

See application file for complete search history.

(56) References Cited

U.S. PATENT DOCUMENTS 6,954,184 B2 * 10/2005 Kurashima et al. ........... 345/1.3
7,330,163 B2 *  2/2008 Nakai et al. .................. 345/1.1

* cited by examiner

*Primary Examiner*—Thuy Vinh Tran
(74) *Attorney, Agent, or Firm*—Mattingly, Stanger, Malur & Brundidge, PC

(57) ABSTRACT

A driver IC (4) and a current driver circuit (40) are shared by a first organic EL panel (2) and a second organic EL panel (3). Therefore, not like conventional cases, the current driving circuit (40) on a side not selected is not necessarily in a standby state, and power consumption can be reduced. In a case where the first and second organic EL panels are passive matrix type, a first diode is provided between each column line of the first and the second organic EL panels and corresponding each terminal pin so as to prevent a reverse flow.

12 Claims, 5 Drawing Sheets

ORGANIC EL DISPLAY DEVICE

This Application is a National Phase Application filed under 35 U.S.C. 371 claiming the benefit of PCT/JP05/04113 filed on Mar. 9, 2005, which has the priority benefits of Japanese Applications Nos. JAPAN 2004-066820 filed on Mar. 10, 2004 and JAPAN 2004-208744 filed on Jul. 15, 2004.

TECHNICAL FIELD

This invention relates to an organic EL display device and, in particular, to an organic EL display device, which has a main display panel and a sub-display panel and is capable of reducing power consumption when a display is switched from one of the display panels to the other and is suitable to minimize the size and the thickness thereof.

BACKGROUND ART

The organic EL display device can perform high luminance display due to spontaneous light emission and is suitable for a small area display. Therefore, the organic EL display device has been paid attention as a next generation display device to be mounted on a portable telephone set, a PHS, a DVD player or a PDA (digital portable terminal device).

In a portable telephone set, for example, a main display panel and a sub-display panel are arranged back to back. A switching of display is performed between the sub-display panel provided on a front side of a cover of the organic EL display device to display information necessary for the sub-display panel when the cover is closed and to display operation information such as a menu on the main display panel provided on a rear side of the cover when the cover is opened.

In this case, the main display panel is for a high resolution color display and the sub-display panel having display area smaller than that of the main display is for a monochromatic display. In particular, the sub-display panel of the portable telephone set displays time and image of a call when a signal is received.

Drivers of the main display panel and the sub-display panel have different specifications and are chipped on respective display substrates. Therefore, these drivers are usually provided separately.

A current drive circuit of the organic EL display panel includes current source drive circuits, for example, output circuits formed by current mirror circuits corresponding to respective terminal pins (column pins), regardless of the type of the organic EL panel, active matrix type or passive matrix type.

In the active matrix type organic EL panel, pixel circuits are provided correspondingly to display cells (pixels) and each pixel circuit drives a transistor according to a voltage stored in a capacitor and the organic EL element (referred to as "OEL element", hereinafter) is current-driven by the transistor.

On the other hand, in the passive matrix type organic EL panel, anodes of the OEL elements arranged in a matrix are connected to output pins of drive current sources through column pins and the OEL elements are driven by the respective drive circuits.

Incidentally, a drive circuit for an organic EL display panel, which is constructed with D/A converter circuits provided correspondingly to column pins, is disclosed in JP2003-234655A (Patent Reference 1). In the drive circuit disclosed in Patent Reference 1, the D/A converter circuits provided correspondingly to the column pins receive display data and a reference drive current, converts the digital display data into an analog signal according to the reference drive current and generates drive currents corresponding to the respective column pins or a current on which the drive currents are generated.

Patent Reference 1: JP2003-234655A

DISCLOSURE OF THE INVENTION

Problem to be Solved by the Invention

In the main display panel and the sub-display panel, driver ICs having current source drive circuits provided correspondingly to data lines or column pins are provided, respectively. Therefore, an area of a compact electronic device such a portable telephone set for mounting the main display panel and the sub-display panel becomes large, so that, for example, reduction of thickness of a cover side casing of the compact electronic device is difficult.

When one of the main display panel and the sub-display panel is operated, a drive current source of the other display panel is not completely cut off and the other display panel becomes a standby state. Therefore, power consumption is increased correspondingly. When a switching of display between the main display panel and the sub-display panel is performed, the standby setting of the drive circuit of one of the main display panel and the sub-display panel is performed and a recovery from the standby state of the drive circuit of the other display panel is performed. Therefore, power consumption is increased by transient current due to the switching.

In order to restrict the increase of power consumption, it may be considered to use a driver IC for the main display panel and the sub-display panel commonly. In such case, it is considered that the number of output pins of the drive IC connected to respective column pins is doubled and the output pins are switched within the driver IC. However, such solution is very difficult due to increase of the number of output pins. In addition, when switches are provided correspondingly to the respective output pins, the circuit size becomes very large.

In particular, when organic EL display panels of the passive matrix type, which requires large output current, are used for both the main display panel and the sub-display panel, an OEL element of the main display panel and an OEL element of the sub-display panel are connected to one output pin in parallel through respective column pins, as capacitive loads. Therefore, there is a problem of erroneous emission of OEL elements of the display panel, whose display is terminated, due to transient phenomenon before and after the switching.

The present invention was made to solve the above mentioned problems of the prior art and an object of the present invention is to provide an organic EL display device, which is possible to prevent erroneous light emission of display panels when a display is switched from one display panel to the other, to reduce power consumption of the organic EL display panel when the display is switched and to make the organic EL display device suitable to reduce size and thickness thereof.

Incidentally, when the main display panel and the sub-display panel are of the passive matrix type and are driven by a common driver, column lines of the display panel on the display drive side (lighting side) are also connected to column lines of the other display panel on the display termination side (non-lighting side) through output pins of the driver.

The OEL element is a capacitive element and a number of OEL elements are connected to the column lines on the non-lighting side. Therefore, when it is driven by the common driver, the column lines of the lighting side are connected to other column lines on the lighting side through parasitic capacitance of the OEL elements on the non-lighting side. Further, in the passive matrix type organic EL panel in which a number of OEL elements are connected to column lines, parasitic capacitance looked from a certain column line becomes large, so that there is a problem that a drive current from the other driven column line flows indirectly to a specific column line through the parasitic capacitance.

Particularly, in a high resolution QVGA full color display, the number of pins of each primary color is 120 and totally 360 pins are necessary, so that three drivers are necessary presently. Therefore, the number of OEL elements connected to one column driver IC is (number of column pins)×(number of row side pins) and, in the main display panel, it becomes 10,000 or more and, in the sub-display panel, it becomes 5,000 or more. Although capacitance of each OEL element is as small as several pF, capacitance increases with increase of the number of OEL elements, so that drive current flowing from one column line to another is increased.

It has been found that, when a certain column line of the display panel on the lighting side becomes black display (drive current "0"), there is a problem of erroneous emission that the black level display is pushed up to gray level due to the indirect flow of the drive current.

Another object of the present invention is to provide an organic EL display device capable of preventing erroneous emission by pushing black level up to gray level when a certain column line of the display panel on the lighting side becomes black display.

Means for Solving the Problem

In order to achieve the objects of the first present invention, an organic EL display device, which includes a first and second organic EL panels, selects either one of the organic EL panels according to a selection signal and drives the selected organic EL panel to perform a predetermined display, comprises a plurality of current drive circuits having output pins connected commonly to data lines or column pins of the first and second organic EL panels, for outputting drive currents of OEL elements from the output pins to the data lines or the column pins connected to the output pins, a reset circuit connected to the output pins for resetting terminal voltages of the OEL elements to a predetermined voltage in a reset period and a first and second scan circuits provided correspondingly to the first and second organic EL panels for scanning scan lines in a row direction or a vertical direction of the first and second organic EL panels, wherein one of the scan circuits corresponding to one of the organic EL panels, which is to be driven, is operated in the reset period according to the selection signal and an operation of the other scan circuit is stopped or the scan operation of the other scan circuit itself is stopped for driving said one organic EL panel and ceasing the other organic EL panel.

According to second invention of the present invention, the first and second organic EL panels of the organic EL display device are of the passive matrix type and first diodes for preventing reverse current flow are provided between column lines of the organic EL panels and terminal pins of the organic EL panels.

Advantage of the Invention

In the first invention, the current drive circuit having output pins common for the first and second organic EL panels is provided. Therefore, there is no need of providing current drive circuits for the respective first and second organic EL panels. Consequently, it is unnecessary to make the organic EL panel, which is not selected, standby state, so that it is possible to reduce power consumption correspondingly.

Further, since the display switching is performed by selecting the scan circuit for scanning the scan line in the row direction of the vertical direction, there is no need of providing a plurality of switches correspondingly to the output pins to thereby restrict an increase of the circuit size. Further, since the display switching from one of the organic EL panels, which is displaying, to the other is performed by the reset control pulse, erroneous emission of the other organic EL panel can be prevented. Further, when the driving of the displaying organic EL panel is ended by making impedance of the output terminals connected to the row side scan line (one horizontal scan line in the vertical direction) of the scan circuit of the displaying organic EL panel high impedance (Hi-Z), it is possible to restrict increase of load capacitance of the non-displaying organic EL panel, which is parallel load of the displaying organic EL panel to thereby restrict increase of power consumption.

In the second invention, since the first diodes for preventing reverse current flow are provided between the column lines and the terminal pins of the organic EL panels, parasitic capacitance due to the first diodes is inserted in parallel to the column lines of the non-displaying organic EL panel. Therefore, the drive current flowing from other column lines of the displaying organic EL panel to a certain column pin passes through the parasitic capacitance of the first diode. Since the parasitic capacitance of the first diode is very small, it is possible to restrict the drive current flowing through the first diode to a small value. In addition, it is possible to prevent the reverse flow of the drive current by the first diode. Consequently, in the displaying panel, there is substantially no pushing up of the column lines displaying black level to gray level. Even when there is the pushing-up, the level pushed up is small and it is possible to prevent erroneous emission of black level, which may be recognized by eyes.

Consequently, it is possible to prevent the erroneous emission and reduce power consumption when the display switching between the main display panel and the sub-display panel is performed, to thereby realize a compact and thin organic EL display device.

BEST MODE FOR CARRYING OUT THE INVENTION

FIG. 1 is a block circuit diagram according to an embodiment of the organic EL display device of the present invention in a case where a current drive circuit is used for two passive matrix type organic EL panels, FIG. 2 is a timing chart when a display switching is performed, FIG. 3 illustrates an organic EL panel, a display of which is stopped when a display switching of a row side scanning circuit is performed, FIG. 4 shows an embodiment capable of preventing erroneous light emission due to pushing up of display luminance of the column lines on the lighting side display panel from black level to gray level and FIG. 5 is a circuit for explaining load impedance of the non-lighting side column line in the embodiment shown in FIG. 4.

In FIG. 1, an organic EL display device 1 includes passive matrix type organic EL panels 2 and 3.

A drive IC (referred to as "IC", hereinafter) 4 provided commonly for the organic EL panels 2 and 3 includes column side output stage current sources $40a, \ldots 40i, \ldots 40n$, row side scanning circuits 41 and 42, an inverter 43 and a reset circuit 44.

The reset circuit 44 is composed of analog switches (transmission gates) 44a, ... 44i, ... 44n connected to respective output pins 5a, ... 5i, ... 5n and a constant voltage diode Dz.

The driver 4 drives one of the organic EL panel 2 and the organic EL panel 3 according to a display selection signal (referred to as "selection signal SEL", hereinafter) "H" (HIGH level) or "L" (LOW level) supplied from a control circuit 12 through an input terminal 4a to make one of the organic EL panels 2 and 3 displayable and the other not displayable.

The control circuit 12 generates the selection signal SEL "H" when a display switch 11 is turned, for example, ON. When the display switch 11 is in OFF state or the display switch 11 is turned OFF, the control circuit 12 sets the selection signal SEL in "L" (LOW level) and outputs the selection signal SEL "L".

Incidentally, the display switching switch 11 in, for example, a potable telephone set having the display device 1, is activated and turned ON when a cover of the telephone set is closed.

The control circuit 12 includes a one-shot circuit 12a, an OR circuit 12b, a timing signal generator circuit 12c and a selection signal generator circuit 12d and generates the selection signal SEL "H" or "L" correspondingly to the ON/OFF operation of the display switch 11 caused by opening and closing of the cover of the potable telephone set.

The organic EL panel 2 is provided as a main display panel on a rear surface side of the cover of the portable telephone set housing the display device 1 and the organic EL panel 3 is provided as a sub-display panel on a front surface side of the cover of the portable telephone set. These organic EL panels 2 and 3 are housed back to back in a cover side casing of the device and the driver 4 is arranged between the organic EL panels 2 and 3 and has output pins connected to column lines (column pins) of the organic EL panels 2 and 3, respectively.

Incidentally, when the organic EL panels 2 and 3 are arranged back to back as mentioned and driven, a horizontal scan direction of one of the organic EL panels is opposite to a horizontal scan direction of the other organic EL panel. Therefore, it is necessary that display data for 1 line in horizontal scan direction of one of the organic EL panels 2 and 3 is set in reverse direction with respect to the other. In such case, it is usual to use a bidirectional shift register. Since such matter is not directly related to the present invention, detailed description thereof is omitted.

The number of display pixels of the organic EL panel 2 (main display panel) is usually different from that of the organic EL panel 3 (sub-display panel). For example, the number of pixels of the organic EL panel 2 is 160 column lines×128 row lines and the number of pixels of the organic EL panel 3 is 96×96.

In the following description, however, 96 output pins of the organic EL panel 2, which are common for the organic EL panel 3, will be described. Incidentally, as to 97 to 160 output pins of the organic EL panel 2, which are not common for the organic EL panel 3, there is no problem since there is no output currents generated at the 97 to 160 output pins by making display data to be set in D/A converters 46 (refer to FIG. 1) corresponding to the output pins, which are 0 when a display is ceased by the display switching. Therefore, the connection of the 97 to 160 output pins is not shown in FIG. 1.

Column lines Xa, ... Xi, ... Xn of the organic EL panel 2 corresponding to 1 horizontal line and column lines Xa, ... Xi, ... Xn of the organic EL panel 3 are connected to the respective output pins 5 (representing output pins 5a, ... 5i, ... 5n) of the output stage current sources 40 (representing the output stage current sources 40a, ... 40i, ... 40n) through the respective column pins.

Each of the row side scan circuits 41 and 42 is constructed mainly with shift registers and CMOS output circuits 6 (refer to FIG. 3). Incidentally, in FIG. 3, each CMOS output circuit 6 is shown as a switch circuit including a pair of switches. One of the switches of the switch circuit connected between a power source line +Vcc and a cathode connection line Y (Y1, Y2, Y3, ... Yi ... ) of the OEL elements is constructed with a P channel MOS transistor and the other switch connected between the cathode connection line Y (Y1, Y2, Y3, ... Yi ... ) of the OEL elements and ground GND is constructed with a N channel MOS transistor.

As shown in FIG. 1, the output stage current source 40 is constructed with a current mirror circuit 45 and the D/A converter circuit 46. The current mirror circuit 45 is constructed with P channel MOS transistors QP1 and QP2. Channel width (gate width) ratio of the input side transistor QP1 and the output transistor QP2 is 1:10.

Sources of the transistors QP1 and QP2 are connected to the power source line +Vcc of about +15V. A drain of the input side transistor QP1 is connected to a common gate and to an output of the D/A converter 46.

The D/A converter 46 converts a reference drive current into an analog current corresponding to display data inputted to the input side transistor of the current mirror circuit.

Each of the analog switches 44X (representing analog switches 44a, ... 44i, ... 44n) is in ON state during a reset period RT determined by a reset signal RS inputted from the control circuit 12 through the input terminal 4b. As shown in FIG. 2(c) and FIG. 2(g), the reset signal RS is "H" during the reset period RT and is usually generated correspondingly to a reset control signal (or a timing control signal RSc). Therefore, the respective output pins 5 are set to voltage VR of a constant voltage diode Dz during the reset period to perform a constant voltage resetting (presetting).

Each of the row side scan circuits 41 and 42 performs the scanning operation in response to an enable signal and the reset control signal RSc, which are in "H" state. The reset control signal RSc is supplied from the timing signal generator circuit 12c of the control circuit 12 through an input terminal 4c.

The row side scan circuit 41 receives a selection signal SEL through the input terminal 4a and the inverter 43 as the enable signal. The row side scan circuit 42 directly receives the selection signal SEL as an enable signal.

Incidentally, the scanning operations of the row side scan circuits 41 and 42 are started at a start of the reset period RT of the reset control signal RSc.

When the display switch 11 is turned OFF from ON, the row side scan circuit 41 receives the selection signal SEL "L" through the inverter 43 as the enable signal and starts the scanning operation in vertical direction (row side) for the organic EL panel 2 in the reset period RT of the reset control signal RSc. On the other hand, when the display switching switch 11 is turned OFF, the row side scan circuit 42 of the organic EL panel 3 receives the selection signal SEL "L" directly and terminates the scanning operation in the vertical direction.

On the other hand, when the row side scan circuits 41 and 42 receive the enable signal "L", the two switches of each CMOS output circuit 6, which are constituted with the P channel MOS transistor and the N channel MOS transistor, respectively, are turned OFF as shown in FIG. 3 to set an output of high impedance (Hi-Z).

On the contrary, when the display switching switch 11 is turned ON from OFF, the row side scan circuit 41 of the organic EL panel 2 receives the selection signal SEL "H" through the inverter 43 as the enable signal, so that the scanning operation in the vertical direction is terminated. On the other hand, when the display switch 11 is turned ON, the row side scan circuit 42 of the organic EL panel 3 receives the selection signal SEL "H" as the enable signal, so that the scan operation in the vertical direction is started from the rising edge of the reset period RT of the reset control signal RSc.

As such, in, for example, the portable telephone set having the organic EL display device 1, the selection signal SEL becomes H when the cover of the portable telephone set is closed, so that the row side scan circuit 42 of the organic EL panel 3 operates and the selection signal SEL becomes "L" when the cover is opened, so that the row side scan circuit 41 of the organic EL panel 2 operates.

Further, the organic EL panel, display of which is ceased correspondingly to the opening/closing of the cover, forcibly enters into the reset period by the reset signal RS inputted from the input terminal 4b and the display switching is performed according to "H" and "L" of the selection signal SEL generated thereafter.

The display switching by the selection signal SEL mentioned above is performed according to the timing of the reset signal RS generated correspondingly to ON/OFF operation of the display switch 11.

As shown in FIG. 1, the one-shot circuit 12a of the control circuit 12 receives the ON/OFF signal of the display switch 11. The OR circuit 12b generates the reset signal RS in response to the reset control signal RSc and an output of the one-shot circuit 12a. The reset control signal RSc is generated by the timing signal generator circuit 12c.

Incidentally, the one-shot circuit 12a is triggered bidirectionally at a rising edge and a falling edge of the ON/OFF signal of the display switch 11 and generates a one-shot pulse P, which is "H", for a constant time period when the display switching switch 11 is turned ON to OFF or OFF to ON. The constant time period is set to the usual reset period RT or longer.

The output of the one-shot circuit 12a is sent to the selection signal generator circuit 12d as the reset signal RS. The selection signal generator circuit 12d is a latch circuit constructed with a flip-flop, which generates the selection signal SEL by latching the ON/OFF signal of the display switching switch 11 as "H" or "1" and "L" or "0" correspondingly to the rising signal at the output of the one-shot circuit 12a. Thus, the display switching is performed at a time when an organic EL panel on the non-display side which is terminated, is reset or thereafter.

FIG. 2 is a timing chart when the display switching is performed.

FIG. 2(a) shows the ON/OFF signal (display switching signal) of the display switch 11, FIG. 2(b) shows a display start pulse DSTP, FIG. 2(c) shows the reset control signal RSc, FIG. 2(d) shows a peak generating pulse Pp and FIG. 2(e) shows a terminal pin drive current in which a solid line shows a drive current and a dotted line shows a drive voltage.

In FIG. 2(a), the display switch 11 is OFF and the cover of, for example, the portable telephone set is opened, so that the organic EL panel 2 is in display state.

In the usual display state, the reset signal RS is generated by the OR circuit 12b upon the reset control signal RSc and the reset period RT of the organic EL panel in the display state is ended at the rising edge of the display start pulse DSTP. At this time point, the reset signal RS falls and the display period D is started. Then, the peak generation pulse Pp is generated, which is counted by a counter in a constant time period from the start of the display period D. At a count end time, the reset signal RS rises again and the operation enters into the reset period RT. As a result, a pin drive current shown in FIG. 2(e) is generated.

When the cover is closed and the display switch 11 is turned from OFF to ON as shown in FIG. 2(a), the display drive is switched from the main display panel to the sub-display panel. In the display period D shown in FIG. 2(a), in response to the ON/OFF signal (display switching signal) from the display switch 11, the one-shot circuit 12a generates a one-shot pulse P shown in FIG. 2(f) as the reset signal RS shown in FIG. 2(g). Therefore, the organic EL panel in the display state is forced to enter into the reset period RT by the one-shot pulse.

As a result, the analog switches 44X are turned ON to set the output pins 5 to the reset voltage VR. Incidentally, since the cathodes of the OEL elements are grounded in the display period D, the terminal voltages of the OEL elements 7 are reset by the turning ON of the analog switches 44X.

At a time when the reset period RT corresponding to the one-shot pulse P is ended, the selection signal SEL is generated by the selection signal generator circuit 12d as shown in FIG. 2(h). Since the display switch 11 is turned ON within the display period D as shown in FIG. 2(a), the selection signal SEL becomes "H" at the end of the reset period.

Further, the scan circuit 41 corresponding to the organic EL panel 2, which becomes non-display state by the selection signal SEL "H", receives the selection signal SEL "L" as the enable signal, so that the two switches of the switch circuit, which is constructed with the P channel MOS transistor and the N channel MOS transistor, of each CMOS output circuit 6 connected to the cathode connection line Y (Y1, Y2, . . . Yi . . . ) of the row side scan circuit shown in FIG. 3 are turned OFF to thereby set the output terminals of the CMOS output circuits 6 to high-impedance (Hi-Z).

The above description is in the case where the display switch 11 is turned ON during the display period D. When the display switch 11 is turned OFF during the display period D, the selection signal SEL becomes "L" and the relation between the organic EL panels 2 and 3 is reversed. When the period of the one-shot pulse P overlaps with the reset period RT or the switching of the display switch 11 is done within the reset period RT, the reset period of the reset control signal RSc overlaps the one-shot pulse P. Therefore, the reset period is unchanged or becomes slightly longer by the overlapping period of the reset period of the reset control signal RSc and the one-shot pulse P and the display switching operation is the same as described above.

That is, when the display switching switch 11 becomes OFF, the selection signal SEL "L" is generated at the end of the reset period or after the reset period is ended by the one-shot pulse P and, when the display switching switch 11 becomes ON, the selection signal SEL becomes "H" after the reset period is ended by the one-shot pulse P. The selection signal SEL thus generated is sent to the respective row side scan circuits 41 and 42, so that these circuits perform the scanning, selectively.

Therefore, when the display panel whose display is to be stopped, receives the ON/OFF signal (display switching signal) from the display switch 11 in the display period, the display switching from one display panel to the other display panel is performed after the reset signal RS is generated according to the one-shot pulse P upon the ON/OFF signal and the one display panel is reset. The other display panel whose display is to be started is started upon the display start pulse DSTP in a next reset period RT, as shown in FIG. 2(i).

When the ON/OFF signal of the display switch 11 is generated correspondingly to the reset period RT of the reset control signal RSc, the display panel whose display is to be started by the display switching is started in a reset period RT after the next reset period RT shown in FIG. 2(i) by blocking the display pulse DSTP after this reset period RT.

Incidentally, the overlapping of the reset period of the control signal RSc and the period of the one-shot pulse P can be detected when the selection signal SEL is changed in the reset period RT of the reset control signal RSc, that is, whether or not there is a rising or falling of the selection signal SEL in the reset period RT of the reset control signal RSc.

When the cover of, for example, the portable telephone set housing the organic EL display device 1 is closed, the operation of the organic EL display device enters into the reset period RT forcibly and the scan operation of the row scan circuit 41 of the organic EL panel 2 is stopped and the scan operation of the row scan circuit 42 of the organic EL panel 3 is started at the start of the reset period RT. When the cover of the portable telephone set is opened, the operation of the organic EL display device enters into the reset period RT forcibly and the scan operation of the row scan circuit 42 of the organic EL panel 3 is stopped and the scan operation of the row scan circuit 41 of the organic EL panel 2 is started at the start of the reset period RT.

Further, the display panel whose display is stopped does not emit light erroneously since all of the cathode connection lines Y become Hi-Z after the resetting.

Incidentally, in the portable telephone set, in order to emphasize a display of telephone number, etc., on a display screen thereof, a display area is defined in a center portion of the display screen and an area surrounding the display area is made black or single colored area. Alternatively, there is a zebra color display formed by alternating black lines and white lines. However, as described previously, when the number of OEL elements connected to one column driver becomes 5,000 or more, drive current flows to a certain column line from other column line through parasitic capacitance of the OEL elements connected to the column line of the non-lighting display panel and the amount of the current becomes large. Due to this fact, the display luminance of the column lines displaying black level is pushed up to gray level.

FIG. 4 shows an embodiment of the present invention, for preventing such erroneous emission.

In FIG. 4, the OEL elements 7 of the non-lighting organic EL display panel 3 are shown by capacitors Cp, respectively. The capacitors Cp are parasitic capacitances of the OEL elements 7.

In the case where the organic EL panels 2 and 3 are driven by the common driver 4 and, for example, the display panel 2 is lighting, the parasitic capacitances Cp of the OEL elements 7 of the non-lighting side display panel 3 are connected in parallel to the column line Xi.

In this embodiment, diodes Da, Db, Dc, ... Dn are inserted in forward direction of the drive current between the column lines Xa, ... Xi, ... Xn of the organic EL panels 2 and 3 and the terminal pins of the organic EL panels 2 and 3 connected to these column lines, respectively, as shown in FIG. 4.

Further, a row line Yo for connecting the cathodes of the diodes Da to Dn together is provided and diodes Dsa, Dsb, Dsc, ... Dsn are provided in the forward direction between the row line Yo and the cathode sides of the diodes Da to Dn so that the row line Yo is connected to the cathodes of the respective diodes Da to Dn. CMOS output circuits 6a and buffer amplifiers (voltage-followers) 6b are provided in the row side scan circuits 41 and 42, respectively, to connect outputs of the buffer amplifiers 6b to the row lines Yo of the organic EL panels 2 and 3. Inputs of the buffer amplifiers 6b are connected to the outputs of the CMOS output circuits 6a, so that the buffer amplifies 6b receive the output voltages of the CMOS output circuits 6a.

Each of the CMOS output circuits 6a includes a switch (P channel MOS transistor) SW1 connected to the power source line +Vcc and a switch (N channel MOS transistor) SW2 connected to a constant voltage source 6c. The voltage of the constant voltage source 6c is Vs.

The diodes Da to Dn inserted in the respective column lines forms indirect drive current preventing circuits for blocking the indirect drive currents and reducing parasitic capacitances of indirect paths, respectively. Further, the diodes Dsa to Dsn, the row lines Yo, the CMOS output circuits 6a and the buffer amplifiers 6b form discharge circuits for blocking reverse flow of the indirect drive current of the column lines Xa to Xn.

Incidentally, the diodes Da to Dn and Dsa to Dsn have PN junctions formed directly in forming the OEL elements before light emitting material is supplied. These diodes are formed together with the OEL elements used for luminance display. Therefore, these diodes do not emit light even when drive currents flow through them. These diodes may be diode-connected transistors or Shottky diodes having low forward drop voltage.

The organic EL panel 2, which is lighting side display panel, receives "H" signal obtained by inverting the selection signal SEL "L" (in the state when the cover is opened) from the selection signal generator circuit 12d by the inverter 43 and the CMOS output circuit 6a turns the switch SW1 ON and the switch SW2 OFF by inverting the "H" signal thus obtained into "L" by an inverter (not shown) provided inside of the CMOS output circuit 6a.

Therefore, the voltage of the row line Yo is pulled up to the power source line voltage +Vcc and becomes "H". As a result, the diodes Dsa to Dsn of the organic EL panel 2, which is the lighting side display panel, are reverse-biased and turned OFF. Therefore, the discharge circuits for blocking reverse current flow are disconnected from the column lines and the diodes Da to Dn are turned ON by the scanning of row side 1 horizontal line for the organic EL panel 2 and have no relation to the lighting side display operation.

On the other hand, the organic EL panel 3, which is non-lighting side display panel, receives the selection signal SEL "L" from the control circuit 12 and the CMOS output circuit 6a turns the switch SW1 OFF and the switch SW2 ON by inverting the "L" signal thus obtained into "H" by the inverter (not shown) provided inside of the CMOS output circuit 6a. Therefore, the row line Yo is set to voltage Vs of the constant voltage source 6c through the buffer amplifiers 6b. The voltage Vs is lower than a lowest voltage of the voltages of the respective column lines, which are generated by the drive currents supplied from the column lines for turning the diodes Da to Dn and Dsa to Dsn ON, by 1.4V (=0.7V×2, where 0.7V is the forward drop voltage of the diode) or more and the voltage Vs is selected such that current flowing under this condition becomes very small. Incidentally, a resistor having large resistance value may be inserted in series with the voltage source outputting the voltage Vs, on demand.

As a result, the diodes Da to Dn and Dsa to Dsn of the non-lighting side organic EL panel 3 are forward-biased and turned ON. In this case, the CMOS output circuits 6 turn the switch circuits connected to the output terminals OFF in response to the selection signal SEL "L" to set the high impedance (Hi-Z) as described previously. As a result, all of the non-lighting side cathode connection lines (Y1, Y2, ... Yi ... ) except the row line Yo of the scan circuit 42 become Hi-Z.

Since, in this embodiment, the driver IC 4 is commonly used for the display panels, the drive current of the organic EL panel 2, which is the lighting side display panel, is supplied to the column lines of the organic EL panel 3, which is the non-lighting side display panel. However, the drive currents flow through the diodes Da to Dn, the diodes Dsa to Dsn and the constant voltage source 6c to ground GND and do not return to other column lines. The drive current itself is very small.

As a result, there is no case where a portion of the drive current from other column line flows indirectly to the column line of the lighting side organic EL panel 2, which is set to black level and does not output the drive current.

For the non-lighting side column line Xi, parasitic capacitance Ci of a diode Di is connected in series with a parallel circuit of a parasitic capacitance Csi of a diode Dsi and the parasitic capacitance Cp×m of the OEL elements 7, as shown in FIG. 5. Incidentally, m is the number of OEL elements 7 connected to the column line Xi.

The parasitic capacitance Ci of each of the diodes Da to Dn is in the order of several pF and is connected in series to each column line. Therefore, a total parasitic capacitance can be restricted to several pF or smaller regardless of the number of the OEL elements 7.

In a case where a drive current of a certain column line flows to a lighting side column line, for example, the column line Xi indirectly, a parasitic capacitance Ci of a diode Di of the certain column line coupled through its OEL element is further connected in series to the circuit having the parasitic capacitance Ci of the diode Di of the column line Xi shown in FIG. 5. Therefore, the indirect drive current is blocked by the parasitic capacitance Ci of the diode Di inserted in series to the column line.

Further, a portion of the drive current of the lighting side column line is sunk through the constant voltage source 6c to ground GND. In this case, since an amount of the current is determined by the voltage of the constant voltage source 6c and is minute, the current does not influence on the lighting side drive current substantially. Incidentally, it may be possible to insert a high resistance circuit in series with the constant voltage source 6c.

Incidentally, the discharge circuit composed of the diodes Dsa to Dsn, the row line Yo, the CMOS output circuit 6a and the buffer amplifier 6b may be not always necessary. That is, since the indirect flow of the drive current can be reduced by only the diodes Da to Dn and, if black level is pushed up to gray level, the gray level is very low, it is possible to prevent erroneous light emission, which is recognizable by eyes. That is, the discharge circuit may be added on demand.

Assuming that the timing control signal divides the display period corresponding to the scan period of one horizontal line from the reset period (scan switching period in vertical direction) corresponding to the retrace period, it is usual in the drive of the passive matrix type organic EL panel to use the timing control signal as the reset control signal. The reset signal RS is usually used in a portion of the reset period RT corresponding to the retrace period.

Therefore, the switching between the organic EL panel 2 and the organic EL panel 3 and the start of operation may be performed according to not the reset control signal but the timing control signal. They may be performed according to the reset signal RS. In the latter case, it is possible to start the operations at the start of the reset period corresponding to the retrace period.

In the described embodiment, although the operation of the vertical scan circuit corresponding to the display panel whose display is to be stopped is stopped by stopping the scan operation, it is of course possible to directly stop the operation of the vertical scan circuit.

Further, in the described embodiment, the display switch is turned ON when the cover of the portable telephone set including the display device 1 is closed. However, the switch may be turned OFF when the cover is closed. In such case, the levels "H" and "L" of the selection signal are reversed.

Incidentally, since it is possible to easily reverse the logic signals by such as an inverter, it is possible to perform the selection operation even when the logic signals are reversed. Further, the display switch is not limited to such as a push button. For example, an optical sensor capable of generating a detection signal in response to light when the cover is opened may be used as the display switch. Other sensors for detecting the display switching may be used. Therefore, the switch or the switch circuit may include a sensor.

Further, in the described embodiment, the main display panel (organic EL panel 2) and the sub display panel (organic EL panel 3) have the column pins connected to the respective output pins of the driver IC 4. However, it may be possible to provide a driver IC for the main display panel.

Further, in the described embodiment, the operation of the vertical scan circuit of one of the first and second organic EL panels, which is driven (or displays) according to the selection signal, is preferably started after the operation of the vertical scan circuit of the other organic EL panel is stopped. The operation stoppage in this case is not limited to a temporary stoppage of the scan operation or to the standby state. The operation of this circuit itself may be stopped.

INDUSTRIAL APPLICABILITY

As described hereinbefore, the constant voltage resetting is performed such that the preset voltage of the output pins of one horizontal line, which is driven in the display period, becomes Vz. However, the reset voltage may be ground potential or other reference potential. Further, although the two passive matrix type organic EL panels are described, the present invention can be applied to active matrix type organic EL panels, which can be reset by the output pins. In such case, the column pins are replaced by a data line, pixel circuits are arranged instead of the OEL elements and OEL elements of the pixel circuits are driven through capacitors provided in the pixel circuit for storing drive current. Further, although the MOSFETs are used mainly, it is of course possible to use bipolar transistors instead of the MOSFETs. Further, the N channel (or npn) type transistors may be replaced by P channel (or pnp) transistors and the P channel transistors may be replaced by N channel (or npn) type transistors. In such case, the power source voltage is usually negative and the transistor provided in the upstream side is provided in the downstream side.

DESCRIPTION OF REFERENCE NUMERALS AND SIGNS

Figure 1:
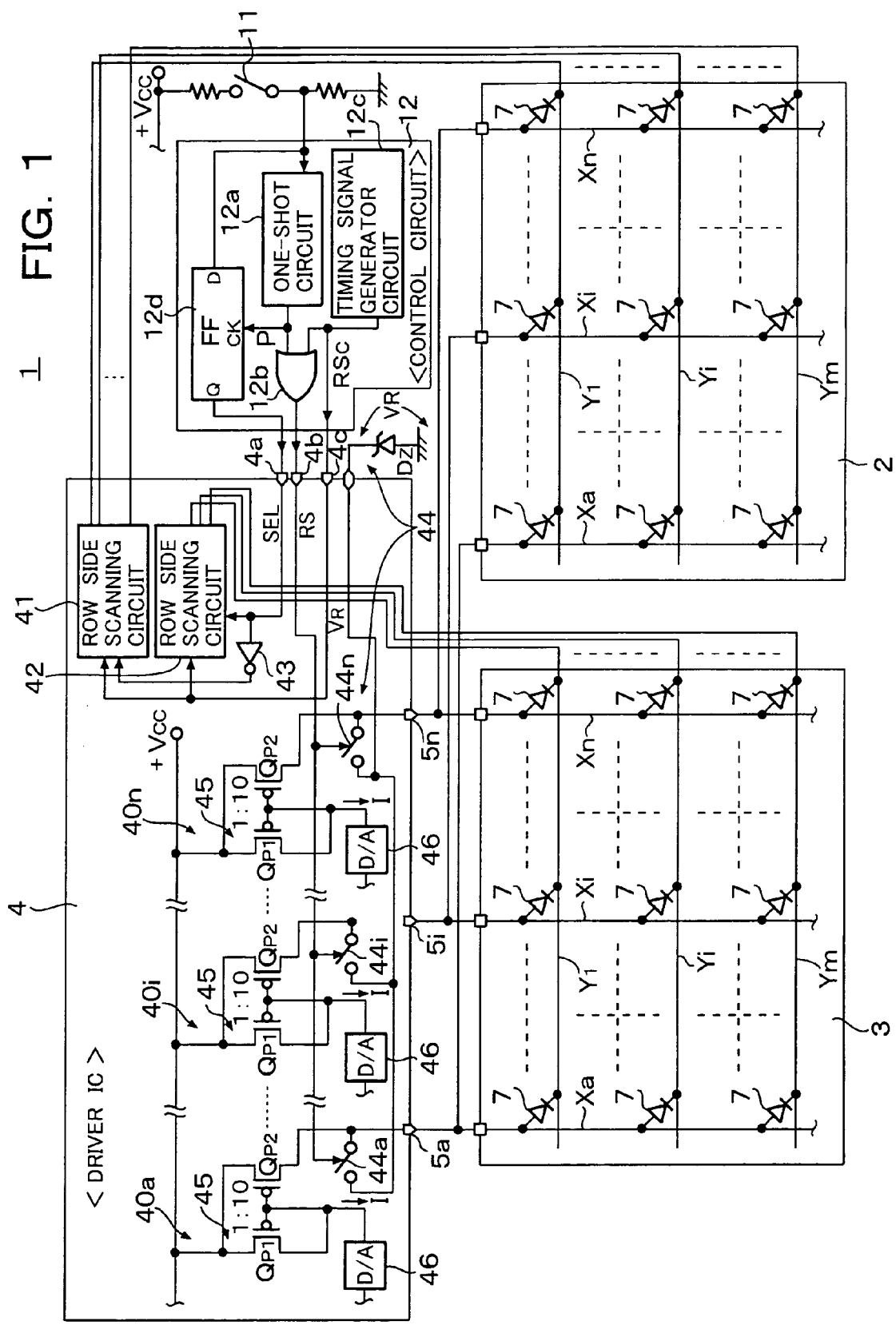
FIG. 1 is a block circuit diagram according to an embodiment of an organic EL display device in which a current drive circuit is used commonly for two passive matrix type organic EL panels.
Figure 2:
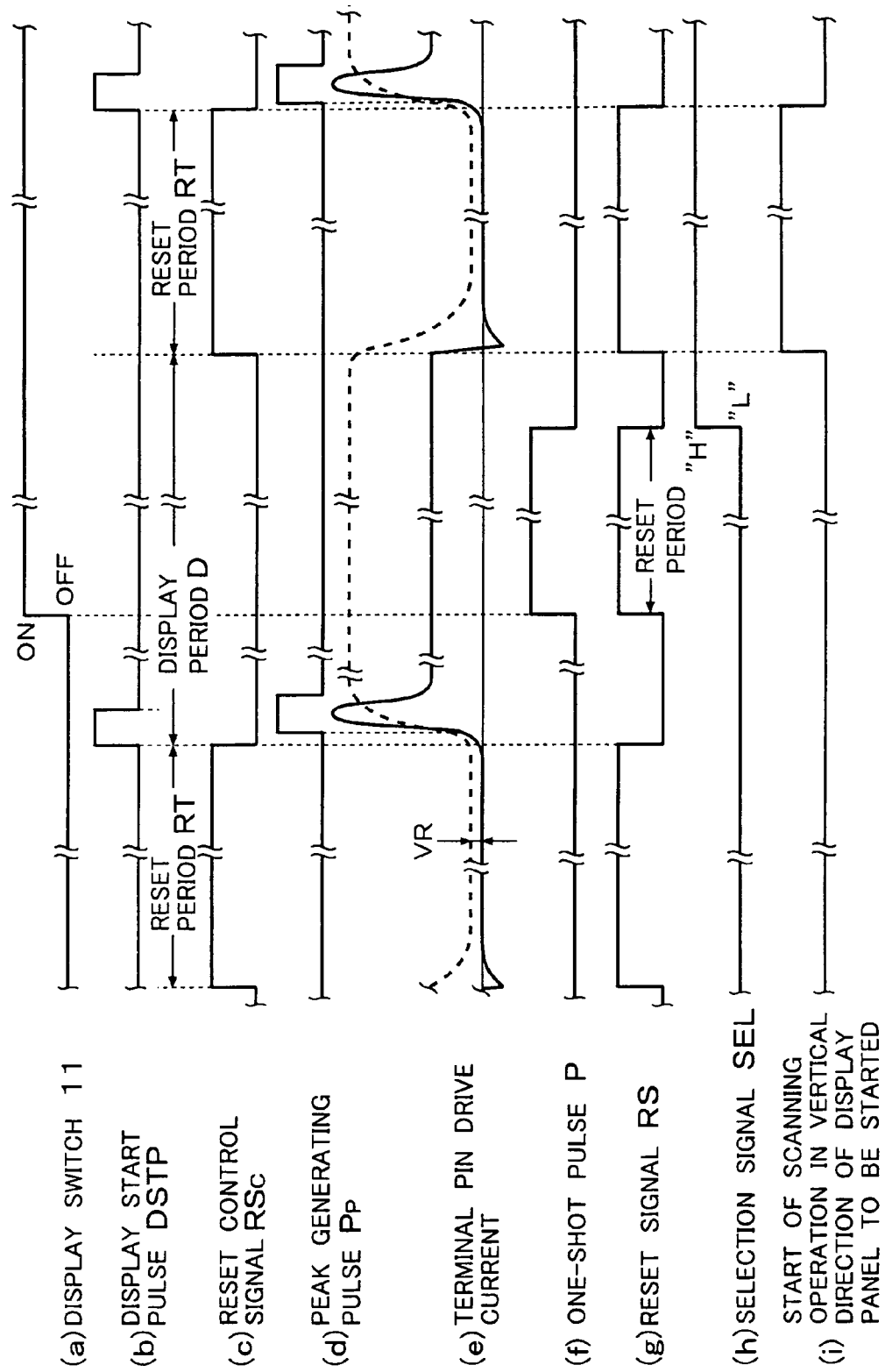
FIG. 2 is a timing chart when a display is switched.
Figure 3:
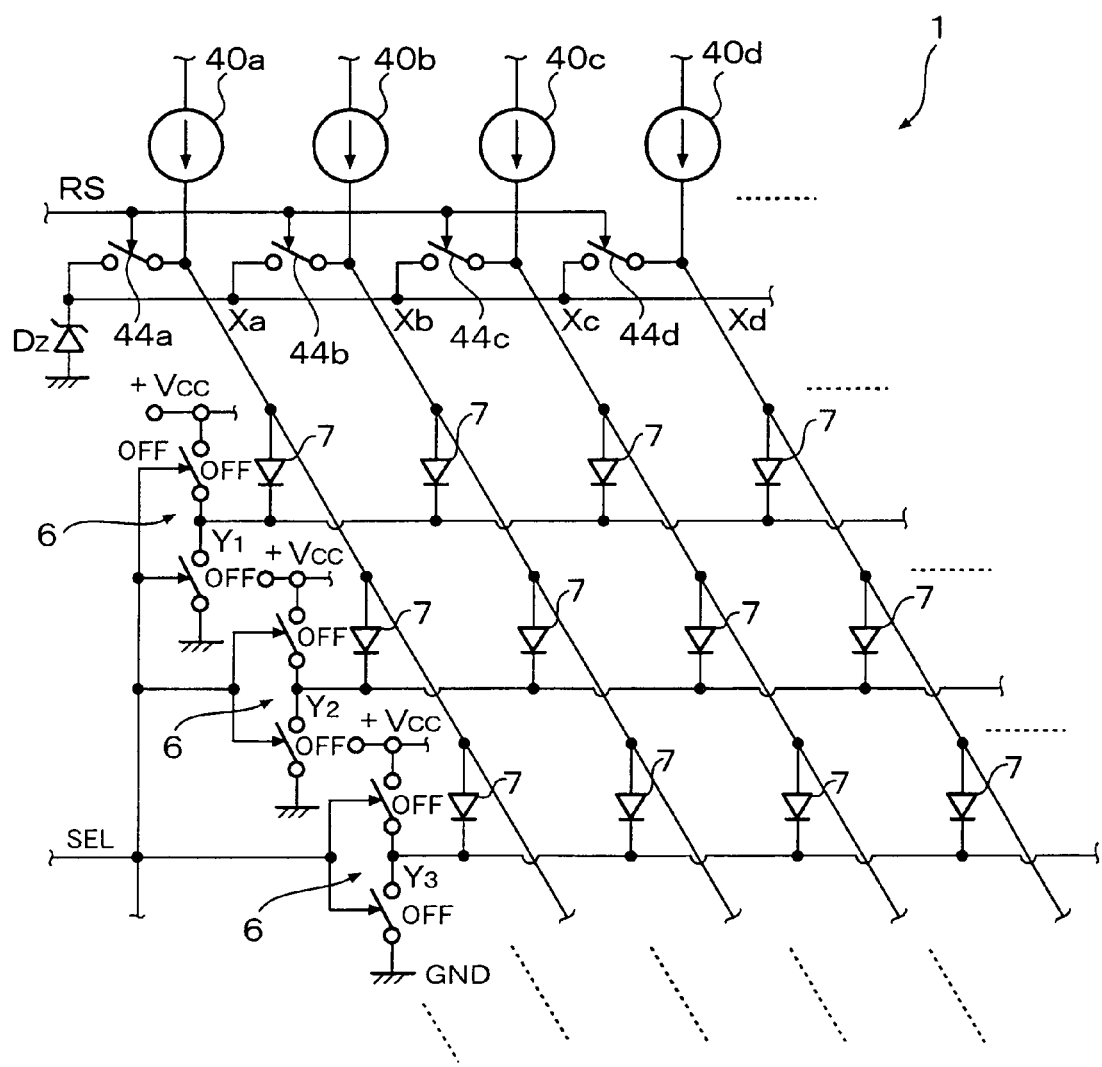
FIG. 3 is a circuit diagram for explaining an organic EL panel whose display is stopped when a display switching is performed in its row side scan circuit.
Figure 4:
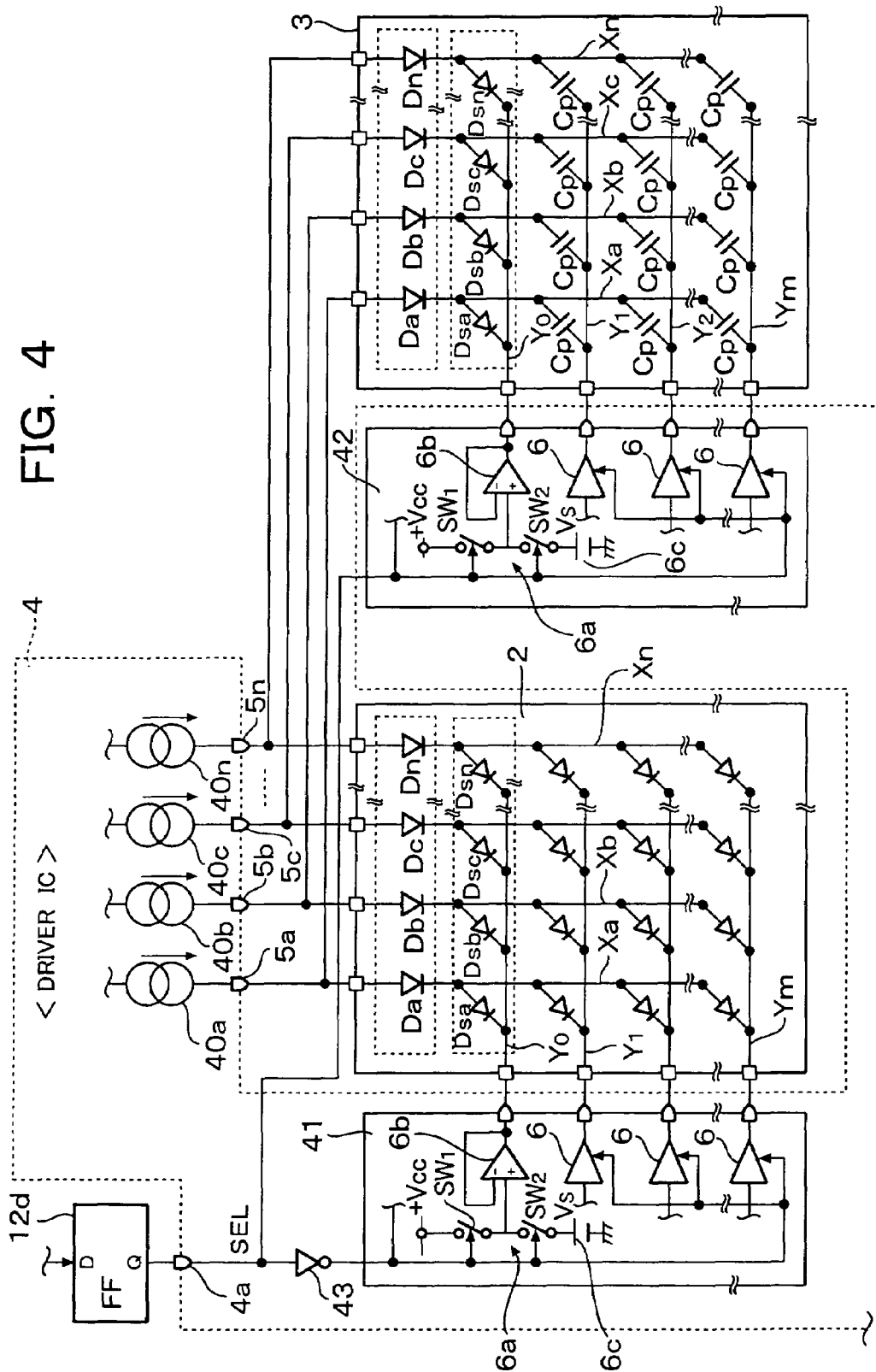
FIG. 4 is a circuit diagram for preventing erroneous emission in a lighting side display panel when display luminance of column lines displaying black level becomes gray level.
Figure 5:
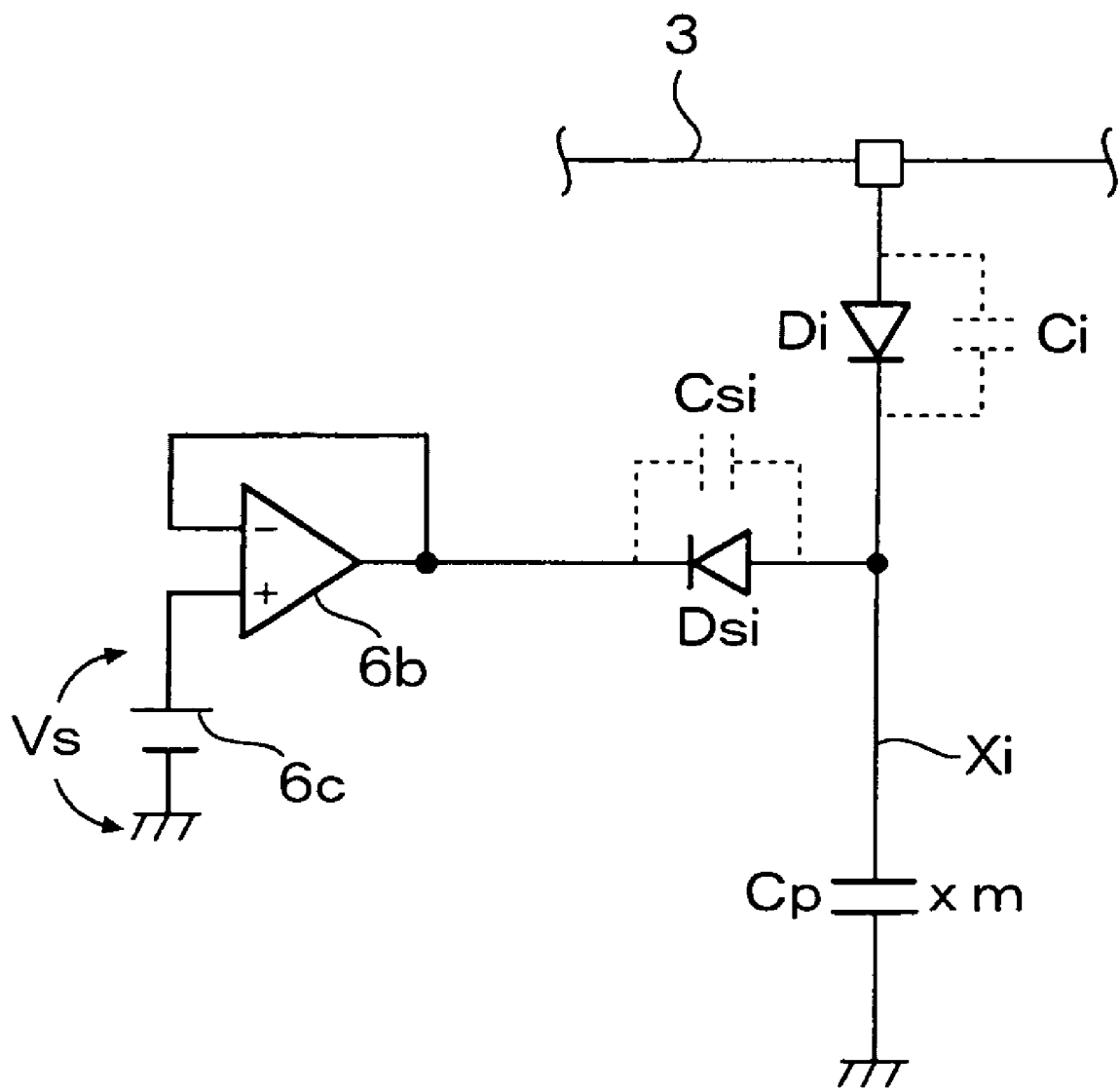
FIG. 5 is a circuit diagram for explaining a load impedance of a non-lighting side column line in FIG. 4.

1 . . . organic EL display device
2,3 . . . passive matrix type organic EL panel
4 . . . driver IC
6 . . . CMOS output circuit
5,5a,5i,5n . . . output pin
6,6a . . . CMOS output circuit
6b . . . buffer amplifier
6c . . . constant voltage source
7 . . . OEL element
40,40a~40n . . . output stage current source
11 . . . display switch
12 . . . control circuit
12a . . . one-shot circuit
12b . . . OR circuit
12c . . . timing signal generator circuit
12d . . . selection signal generator circuit
41,42 . . . row side scan circuit
43 . . . inverter
44 . . . reset circuit
46 . . . D/A converter circuit
44a,44i,44n,44x . . . analog switch
45 . . . current mirror circuit
Da,Di,Dn . . . diode
Y0,Y1,Y2,Yi . . . cathode connection line

The invention claimed is:

1. An organic EL display device, which includes a first and second organic EL display panels, selects either one of the organic EL display panels according to a selection signal and drives the selected organic EL display panel to perform a predetermined display, comprising
a plurality of current drive circuits having output pins connected commonly to data lines or column pins of the first and second organic EL panels, for outputting drive currents for driving organic EL display elements from the output pins to the data lines or the column pins connected to the output pins,
a reset circuit connected to the output pins for resetting terminal voltages of the organic EL display elements to a predetermined voltage in a reset period, and
a first and second scan circuits provided correspondingly to the first and second organic EL display panels for scanning scan lines in a row direction or a vertical direction of the first and second organic EL panels,
wherein one of the first and second scan circuits corresponding to one of the organic EL panels, which is to be driven, is operated in the reset period according to the selection signal and an operation of the other scan circuit is stopped or the scan operation of the other scan circuit itself is stopped for driving said one organic EL panel and ceasing the other organic EL panel.

2. The organic EL display device as claimed in claim 1, wherein the reset period is determined by a timing control signal or a reset control signal for dividing the display period corresponding to the scan period of one horizontal line from the reset period corresponding to a retrace period of horizontal scan, the reset circuit performs a reset operation according to one of a signal corresponding to the timing control signal, the reset control signal and a reset signal in the reset period.

3. The organic EL display device as claimed in claim 2, wherein the first and second organic EL display panels are of the passive matrix type, the output pins are connected to the column pins of the first and second organic EL display panels, respectively, and a start of scan operation of the scan circuit for one of the first and second organic EL display panels is after a scan operation of the other scan circuit is stopped or the scan operation of the other scan circuit itself is stopped.

4. The organic EL display device as claimed in claim 3, wherein the stopping of the scan operation of the scan circuit of the other organic EL display panel or the stopping of the scan operation itself is performed after the terminal voltage of the organic EL display element is reset by the reset circuit and all of the output terminals of the scan circuit of the other organic EL display panel, to which the scan lines of the other organic EL display panel are connected, are set to high impedance.

5. The organic EL display device as claimed in claim 4, further comprising a switch, which performs an ON/OFF operation according to an open/close operation of a cover of a device having the organic EL display device, wherein one of the first and second organic EL display panels is a main display panel and the other organic EL display panel is a sub-display panel and the selection signal is generated correspondingly to ON/OFF of the switch.

6. The organic EL display device as claimed in claim 5, wherein the scan line corresponds to one horizontal line and the switch performs ON/OFF operation correspondingly to a signal from an optical sensor provided in the device.

7. The organic EL display device as claimed in claim 1, wherein the first and second organic EL display panels are of the passive matrix type, the output pins are connected to column pins of the first and second organic EL display panels, respectively, and first diodes for preventing reverse current flow are provided between a column line connected to the column pins of the first and second organic EL display panels and the column pins, respectively.

8. The organic EL display device as claimed in claim 7, wherein the first and second organic EL display panels include connection lines in row direction for connecting cathodes of the first diodes, respectively, second diodes inserted between the cathode sides of the first diodes and the connection lines in forward direction corresponding to the first diodes are provided, the connection lines of the first and second organic EL display panels are selectively connected to a first potential line or a second potential line, the first potential is to reverse biasing the second diodes and the second potential is to forward biasing the second diodes.

9. The organic EL display device as claimed in claim 8, wherein the connection lines of the first and second organic EL display panels are connected to the first or second potential line through buffer amplifiers, respectively, the second diodes of the one organic EL display panel are connected to the first potential line of the one organic EL display panel, the second diodes of the other organic EL display panel are connected to the second potential line of the other organic EL display panel and all of the output terminals of the scan circuit of the other organic EL display panel, to which the scan lines of the other organic EL display panel are connected, are set to high impedance.

10. The organic EL display device as claimed in claim 9, wherein voltages of the first potential line and the second potential line are lower than a voltage, which is the lowest voltage of the respective column pins generated by the drive currents supplied to the respective column pins reduced by a sum of the forward drop voltage of the first diodes and the forward drop voltage of the second diodes.

11. The organic EL display device as claimed in claim 9, wherein the scan operation of the scan circuit of one of the first and second organic EL display panels is started after the scan operation of the other scan circuit is stopped or the operation of the other scan circuit itself is stopped.

12. The organic EL display device as claimed in claim 11, wherein the stoppage of the scan operation of the other scan circuit or the stoppage of the scan operation of the other scan circuit itself is performed after the resetting of the terminal voltage of the organic EL display elements by the reset circuit and all of the output terminals of the scan circuit of the other organic EL display panel, to which the scan lines of the other organic EL display panel are connected, are set to high impedance.

* * * * *